(12) United States Patent
Ljung et al.

(10) Patent No.: US 8,098,673 B2
(45) Date of Patent: Jan. 17, 2012

(54) METHOD AND APPARATUS FOR COMMUNICATION DEVICE CONFIGURATION

(75) Inventors: Magnus Ljung, Nättraby (SE); Magnus Lindström, Karlskrona (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/520,732

(22) PCT Filed: Dec. 21, 2007

(86) PCT No.: PCT/SE2007/051069
§ 371 (c)(1),
(2), (4) Date: Feb. 24, 2010

(87) PCT Pub. No.: WO2008/079094
PCT Pub. Date: Jul. 3, 2008

(65) Prior Publication Data
US 2010/0214929 A1    Aug. 26, 2010

(30) Foreign Application Priority Data
Dec. 22, 2006 (SE) ........................ 0602820

(51) Int. Cl.
*H04L 12/28* (2006.01)
(52) U.S. Cl. ...................... 370/401; 370/349

(58) Field of Classification Search ............... 370/310, 370/310.2, 328, 338, 349, 254, 401
See application file for complete search history.

(56) References Cited

U.S. PATENT DOCUMENTS

| | | | |
|---|---|---|---|
| 6,970,694 B2 * | 11/2005 | Shaheen | 455/414.1 |
| 2005/0221770 A1 * | 10/2005 | Shipshock | 455/88 |
| 2008/0146255 A1 * | 6/2008 | Gopalakrishnan et al. | 455/466 |

OTHER PUBLICATIONS

McGuiggan, P. GPRS in Practice A Companion to the Specifications Wiley; 1st Edition Sep. 20, 2004.

* cited by examiner

*Primary Examiner* — Brenda H Pham

(57) ABSTRACT

A User Equipment UE sends a PDP context activation request with an invalid APN to an SGSN. When detecting an invalid APN the SGSN creates a PDP context activation request towards a GGSN and inserts a default APN. The GGSN detects the default APN and sends a RADIUS Accounting request message to a Device Management System DMS. The DMS initiates a device management configuration flow towards the UE using IP over the existing PDP context or an SMS bearer and responds with a RADIUS Accounting response message to the GGSN. When the RADIUS Accounting response message is received the GGSN will initiate a successful Create PDP context response towards the SGSN causing a successful PDP Context Activation Response towards the UE. An advantage of the invention is that it can detect devices having no GPRS configuration and devices having a faulty GPRS configuration.

6 Claims, 5 Drawing Sheets

METHOD AND APPARATUS FOR COMMUNICATION DEVICE CONFIGURATION

FIELD OF INVENTION

The present invention relates to communication device configuration and more particularly to a method and apparatus for detecting devices with incorrect GPRS configuration.

BACKGROUND

Today there exist several methods for detecting new terminals/devices that enter a mobile network and send device configurations to these devices automatically.

The detection of new subscriber/device combination, in other words, new IMSI/IMEISV combinations and forwarding this information from MSC/SGSN to HLR has been standardized in 3GPP release 6. See ref [1] to [7] for more information. This detection method is usually extended with a non-standardized interface between HLR and a Device Management System that performs the actual configuration of the detected device.

One of these methods described in WO 03/096724 A1 is based on information collected in the SGSN node.

The existing solutions detect new IMSI/IMEISV combinations which identify new subscriber/device combinations that need to be configured for different services. The configuration of the devices is then executed using either OMA CP or OMA DM methods.

A drawback with OMA CP is the one way communication towards the device and it can thereby not be confirmed if the service settings have been accepted by the subscriber or not. This has been solved in OMA DM protocols since the configuration can be read from the device and it can be confirmed that the service settings have been accepted.

None of the methods for detection/configuration in the prior art can automatically detect if subscribers change or delete the GPRS settings in the device, for example by accident or after a repair/firmware upgrade.

SUMMARY OF INVENTION

The present invention relates to the problem of providing an improved apparatus and method for detecting devices with incorrect GPRS configuration. The above mentioned drawbacks of how to automatically detect if subscribers change or delete the service settings in the device are to be avoided. The problem can arise for example by accident or after a repair/firmware upgrade.

According to one aspect of the invention this problem is solved by a method and apparatus for detecting devices with incorrect GPRS configuration. The method and apparatus include in a Serving GPRS Support Node performing the steps of receiving a PDP context activation request from a device and detecting an invalid APN. If an invalid APN is detected a default APN is inserted in a PDP context activation request to a Gateway GPRS Support Node.

According to another aspect of the invention this problem is solved by a method and apparatus for detecting devices with incorrect GPRS configuration. The method and apparatus include in a Gateway GPRS Support Node performing the steps of receiving a PDP context activation request from a Serving GPRS Support Node and detecting a default APN. If a default APN is detected a device management request message is sent to a Device Management System.

According to yet another aspect of the invention this problem is solved by a method and apparatus for detecting devices with incorrect GPRS configuration. The method and apparatus include in a Device Management System performing the steps of receiving a device management request message from a Gateway GPRS Support Node, sending a device management response message to the Gateway GPRS Support Node and sending a device management action to the device.

The purpose with the invention is to automatically detect un-configured or badly configured GPRS devices in order to send new GPRS configurations to the device.

An advantage of the invention is that it can detect devices having no GPRS configuration and devices having a faulty GPRS configuration.

Preferred embodiments of the invention will now be described in more detail with reference to the enclosed drawings.

DETAILED DESCRIPTION OF THE INVENTION

Figure 1:
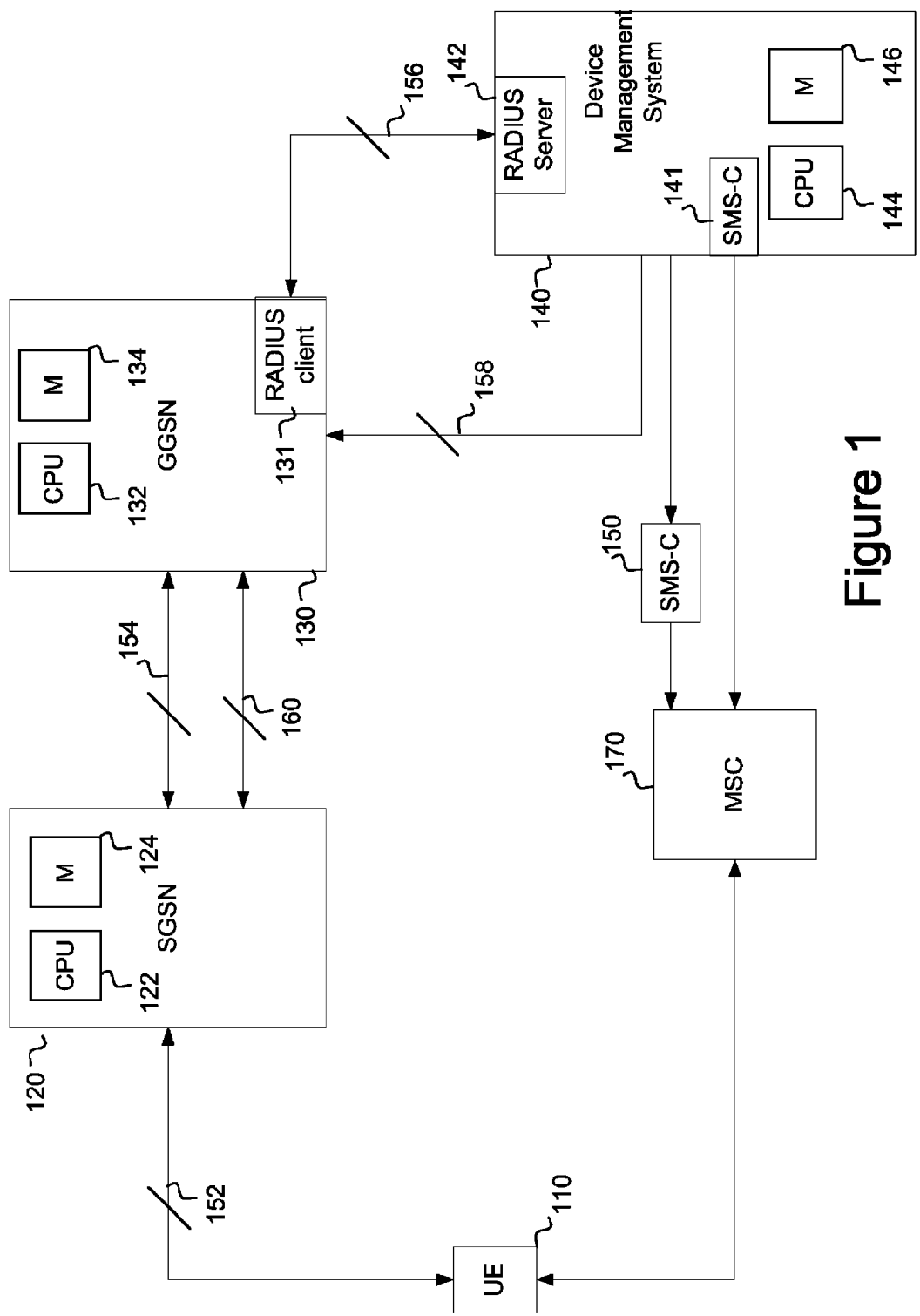
FIG. 1 is a block diagram of system architecture according to an embodiment of the invention.

FIG. 1 shows a block diagram of system architecture according to an embodiment of to the invention.

A User Equipment UE 110 communicates with a Serving GPRS Support Node SGSN 120 over a signaling interface 152. The SGSN is having a processor 122 and a memory 124 having instructions accessible from the memory and processable by said processor. The SGSN communicates with a Gateway GPRS Support Node GGSN 130 over a Gn signaling interface 154. The GGSN is having a processor 132 and a memory 134 having instructions accessible from the memory and processable by said processor. A RADIUS client 131 of the GGSN communicates with a Radius Server 142 of a Device Management System DMS 140 using for example RADIUS on a Gi interface 156. The DMS is having a processor 144 and a memory 146 having instructions accessible from the memory and processable by said processor. The Device Management System includes a server with OMA CP capabilities or OMA DM capabilities or both handling device management information sent to the GGSN using a device management protocol (e.g OMA DM or OMA CP) over the Gi interface 158 to be further transmitted to the SGSN on the Gn interface 160 and finally reaching the UE.

Alternatively the device management information is sent using an internal SMS-C 141 or an external SMS-C 150 to be further transmitted to the MSC 170 and finally reaching the UE using a SMS bearer.

Figure 2:
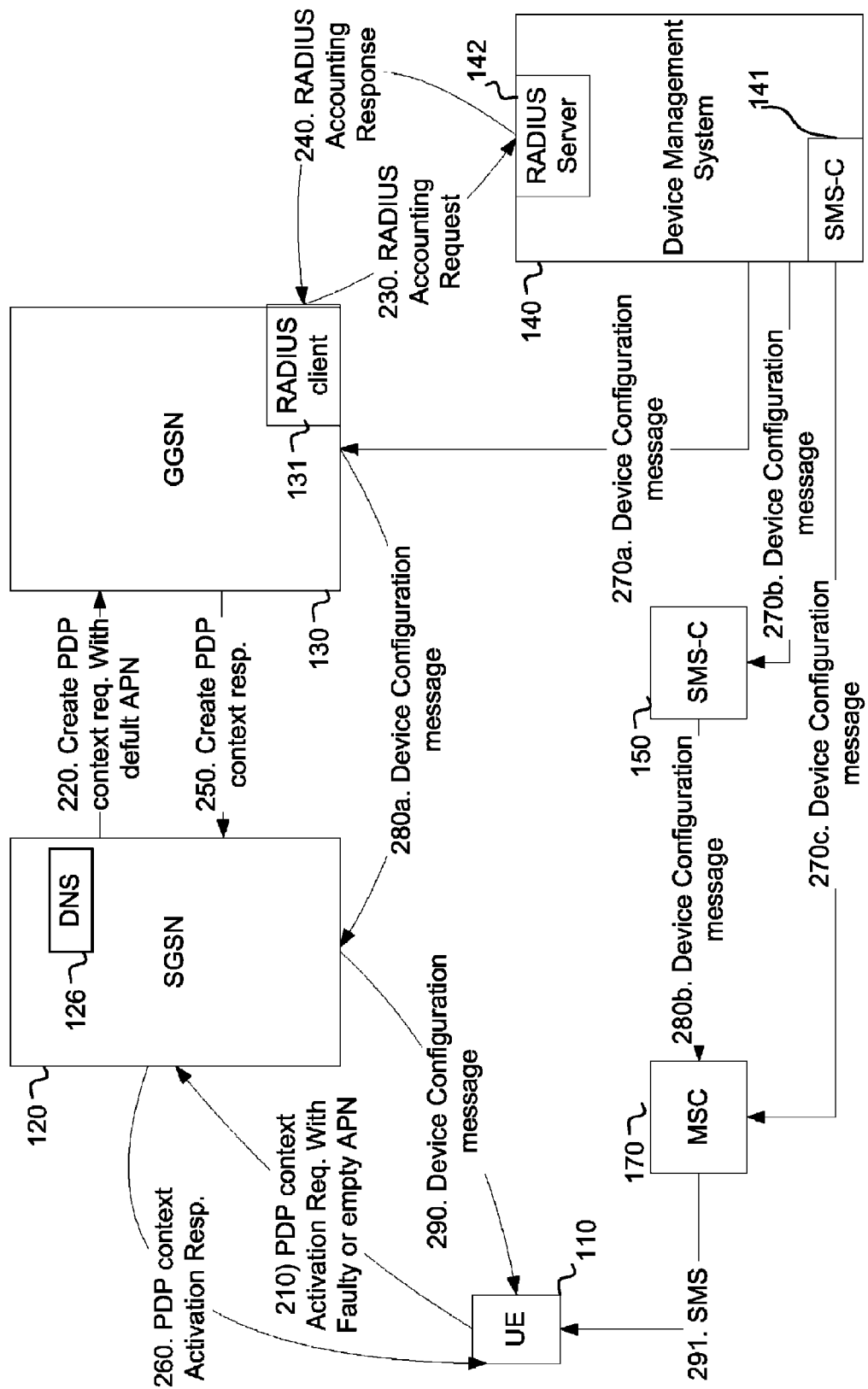
FIG. 2 is a block diagram showing a message flow according to an embodiment of the invention.

FIG. 2 shows a block diagram showing a message flow in the system of FIG. 1.

The UE 110 sends PDP context activation request with an empty or faulty APN to the SGSN 120 in message 210. When detecting an empty APN or an unsubscribed APN or an APN not present in a Default Name Server DNS 126 the SGSN creates a PDP context activation request and inserts a default APN. In message 220 a PDP context activation request with the default APN is sent to the GGSN 130. The PDP context activation requests further includes IMEISV, MSISDN and IMSI parameters. The GGSN, on receipt of the PDP context activation request detects the default APN and sends in message 230 a RADIUS Accounting request message to the RADIUS Server 142 of the DMS 140. The RADIUS Accounting request message includes the IMEISV, MSISDN and IMSI parameters but also adds an Internet Protocol IP address of the UE 110. In message 240 the DM sends a RADIUS Accounting response to the RADIUS client 131 of the GGSN. Also, the device management configuration flow using IP over the existing PDP context is initiated by a device configuration management message to the GGSN in message 270a. The device configuration management message is further sent to the SGSN in message 280a and from the SGSN to the UE in message 290.

As an alternative embodiment the Device Management Server 140 may instead of using IP towards the UE use SMS as bearer. In message 270b the Device Management Server 140 initiates an SMS towards an external SMS-C 150. In message 280b an SMS with device configuration information is transmitted to the MSC 170 serving the UE that forwards the message to the UE in message 291. An alternative path is to use the internal SMS-C 141 to send the SMS in message 270c.

When the RADIUS Accounting Response message 240 is received by the Radius Client 131 in the GGSN, the GGSN will initiate a successful Create PDP context response in message 250. In message 260 the SGSN will initiate a successful PDP Context Activation Response towards the UE.

Figure 3:
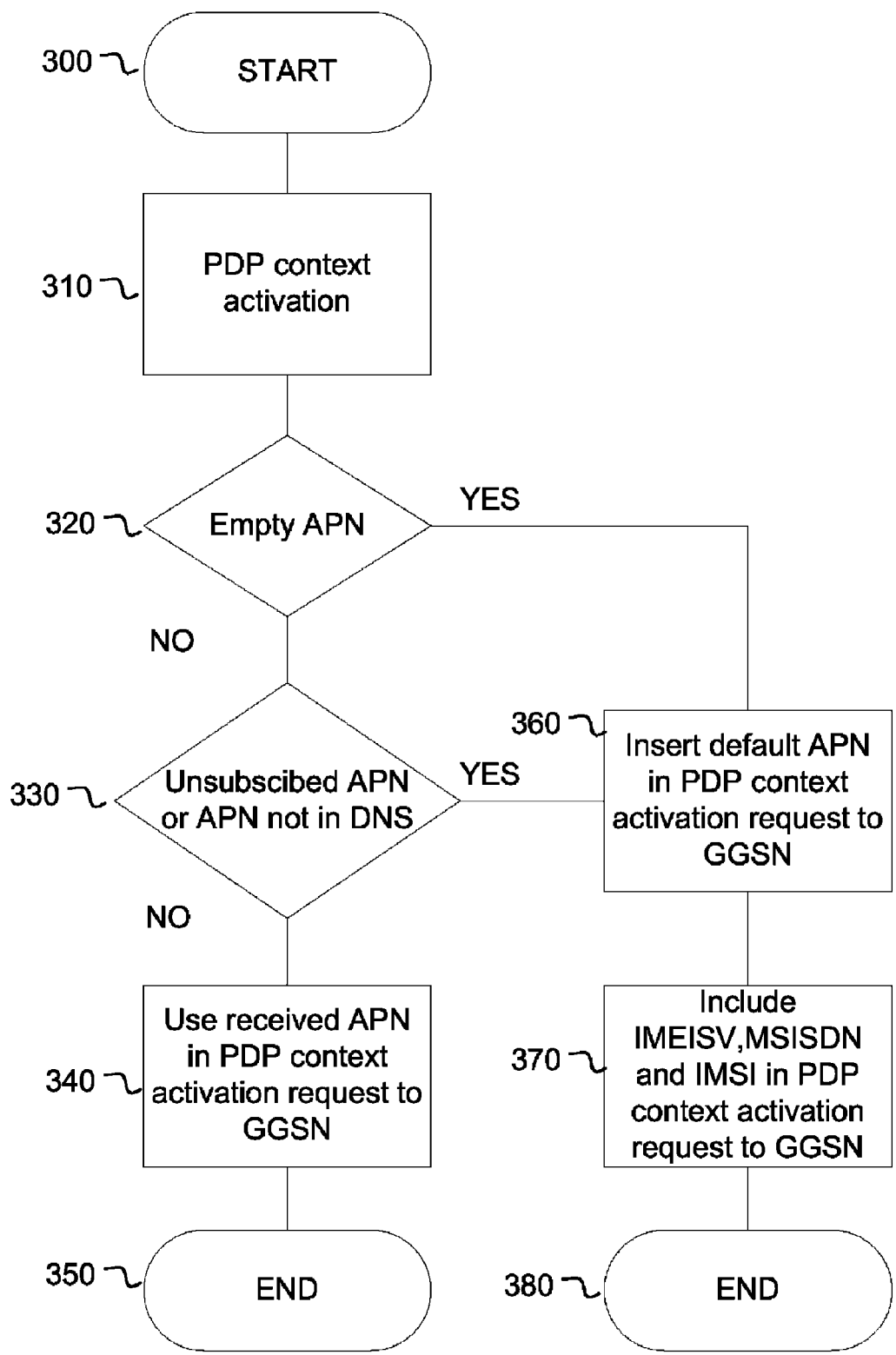
FIG. 3 is a flow chart showing the steps of a Serving GPRS Support Node according to an embodiment of the invention.

FIG. 3 shows the steps of a Serving GPRS Support Node SGSN according to an embodiment of the invention.

The method starts in step 300. In step 310 a request is received from a GPRS capable device/UE which tries to activate a PDP context. The SGSN detects an empty APN in step 320. If the APN is not empty the SGSN checks in step 330 whether the request concerns an unsubscribed APN or an APN not in a Default Name Server DNS. If any of step 320 or step 330 is confirmative the SGSN inserts in step 360 a default APN instead of the empty or unsubscribed APN received from the terminal in the PDP context request. This default APN is used in the create PDP context request message sent to the GGSN in step 370. In the create PDP context request towards the GGSN also the IMEISV, IMSI and MSISDN are included. The method ends in step 380

If the APN is not unsubscribed or is present in the DNS the SGSN uses in step 340 the received APN in a PDP Context Activation Request sent to the GGSN and the method ends in step 350.

Figure 4:
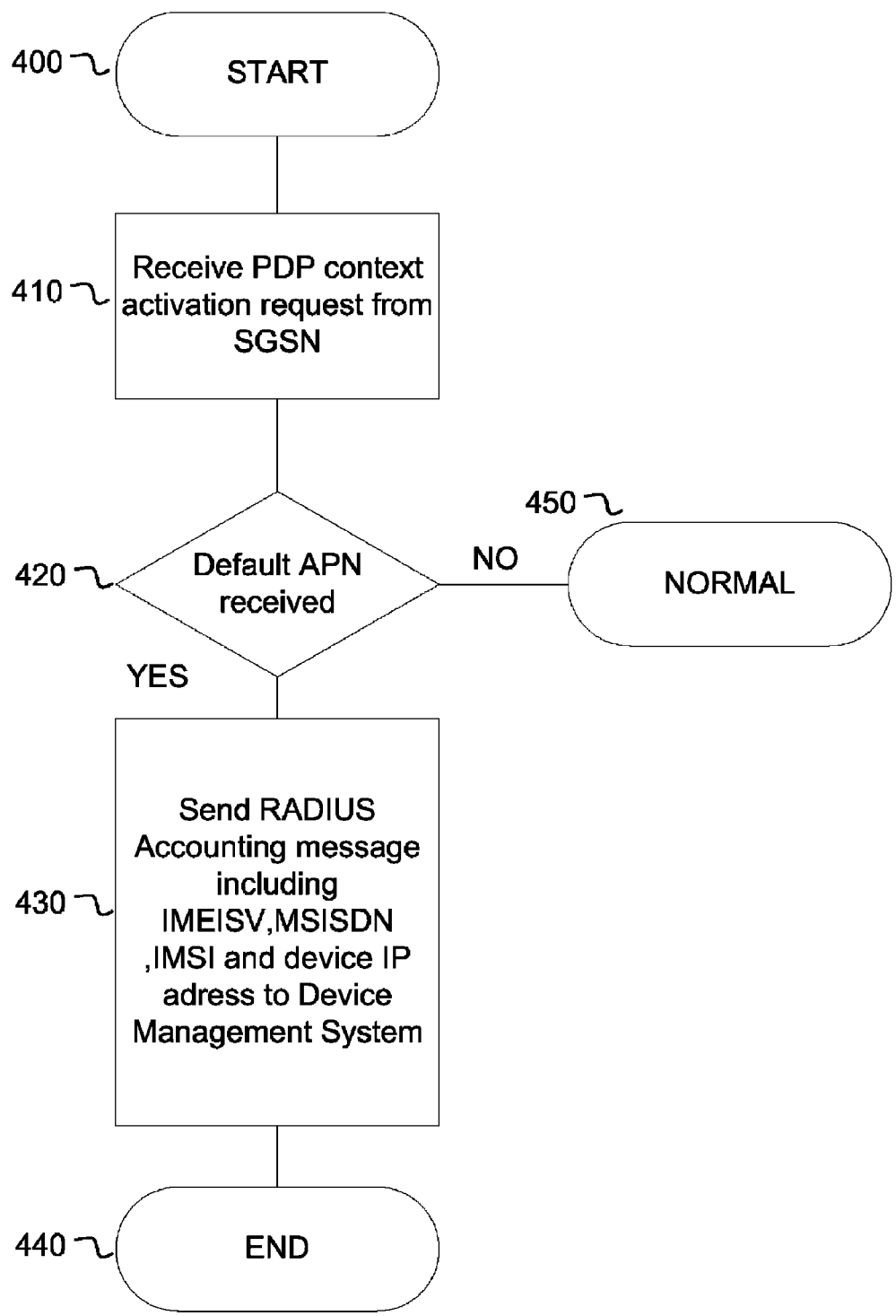
FIG. 4 is a flow chart showing the steps of a Gateway GPRS Support Node according to an embodiment of the invention.

FIG. 4 shows the steps of a Gateway GPRS Support Node GGSN according to an embodiment of the invention.

The method starts in step 400. In step 410 the create PDP context request from the SGSN is received in the GGSN. In step 420 the GGSN checks if the default APN is received. If the default APN was not received from the SGSN the normal flow, the normal connection set up procedure for a valid PDP context, is followed in step 450. In case it is the default APN received the GGSN initiates in step 430 a message, e.g. a RADIUS accounting request, towards the device management system that will act as a RADIUS server for this APN. The IMEISV, IMSI, MSISDN are included in the RADIUS accounting request. Also the IP address of the device is included. The method ends in step 440.

Figure 5:
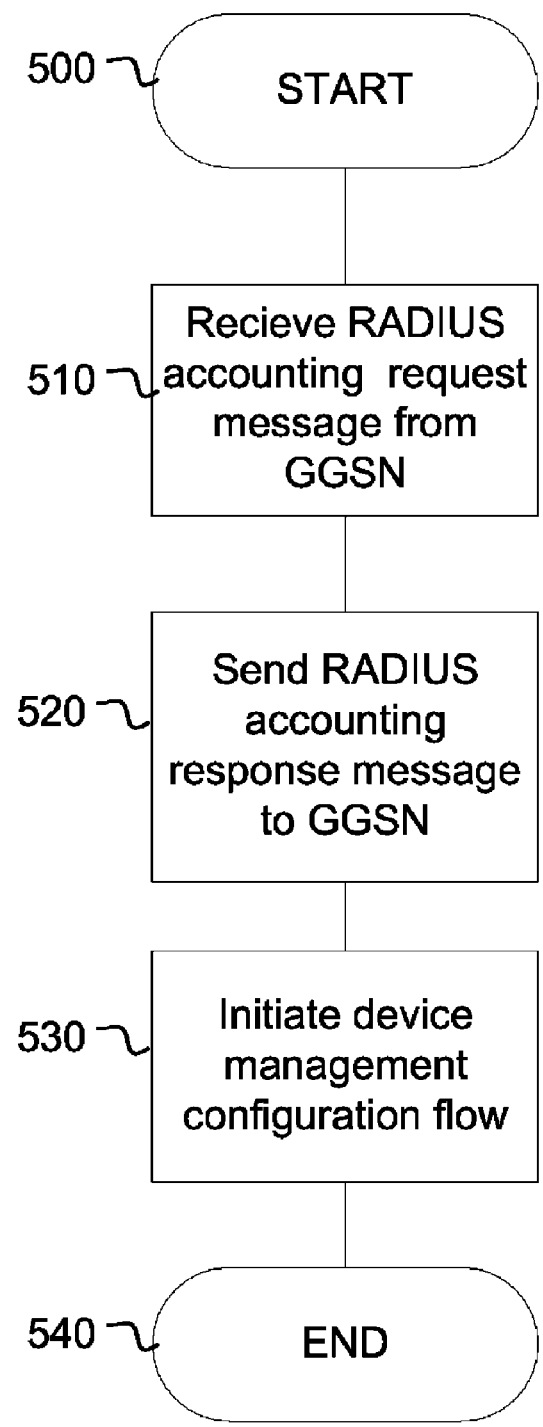
FIG. 5 is a flow chart showing the steps of a Device Management server according to an embodiment of the invention.

FIG. 5 shows the steps of a Device Management server according to an embodiment of the invention.

The method starts in step 500. In step 510 the device management system stores the IMEISV, MSISDN, IMSI and device IP address information. In step 520 a response message, e.g. a RADIUS accounting response message, is sent back to the GGSN to authorize the PDP context set up.

In step 530 the device management system uses the received and stored information to decide the device model and initiates sending of a configuration messages to the device either using OMA CP or OMA DM standard or the OMA CP standard or any other device management protocol. Since an IP address has been allocated to the UE by the GGSN the integrated PPG in the device management system may choose to send the device configuration message over the existing PDP context. The method ends in step 540.

An advantage of the invention is that it can, in addition to devices having no GPRS configuration at all, automatically detect devices having a faulty GPRS configuration. This means that the subscriber instead of receiving an error message for a failed PDP context activation can receive for example a message that it has faulty configurations and will soon receive correct settings. This message can either be sent over an SMS bearer or the currently active PDP context.

Yet another advantage with the invention is that it can automatically detect that the subscriber has destroyed or changed the received settings, or accepted sent service configurations.

Another advantage with the invention is, when using RADIUS, the RADIUS accounting message also includes the IP address of the UE. This implies the further advantage that service configurations can be sent to the device directly using OMA CP or OMA DM or other protocols over the existing PDP context which saves SMS communication.

An advantage is also that the fact that the IP address is received in the device management system also makes it possible to send a web page to devices notifying for example that is impossible to send service configurations to it. This web page can give the user instructions how to manually configure the device.

The invention is also a cost efficient solution that utilize existing infrastructure and since all the interfaces are standardized (Gn interface between SGSN and GGSN and the use of RADIUS on the Gi interface from GGSN to RADIUS Server) the invention will increase the possibilities to deploy a device management solution in a multi vendor network.

Abbreviations:
3GPP 3rd Generation Partnership Project
APN Access Point Name
GGSN Gateway General Packet Radio Service Support Node
GPRS General Packet Radio Service
HLR Home Location Register
IMEISV International Mobile Equipment Identity+Software Version
IMSI International Mobile Subscriber Number
IP Internet Protocol
MSC Mobile Services switching Center
MSISDN Mobile Station Integrated Services Digital Network number
OMA DM Open Mobile Alliance Device Management
OMA CP Open Mobile Alliance Client Provisioning
OTA Over The Air
PDP Packet Data Protocol
PPG Push Proxy Gateway
RADIUS Remote Authentication Dial In User Service
SGSN Serving General Packet Radio Service Support Node
SMS Short Message Service
SMS-C Short Message Service Center
UE User Equipment (Device and U(SIM))

References:

[1] 3GPP TS 23.012, V6.3.0
3rd Generation Partnership Project;
Technical Specification Group Core Network;
Location management procedures (Release 6) applicable chapters: ch. 4.1.3.1

[2] 3GPP TS 29.002, V6.12.1
3rd Generation Partnership Project;
Technical Specification Group Core Network and Terminals;
Mobile Application Part (MAP) specification
(Release 6) applicable chapters: ch. 8.1.2.2, ch. 8.1.2.3, ch. 8.1.7.2, ch. 8.1.7.3, ch. 17.7.1

[3] 3GPP TS 23.060, V6.11.0
3rd Generation Partnership Project;
Technical Specification Group Services and Systems Aspects;
GPRS Service description
(Release 6) applicable chapters: ch. 6.5.3, ch. 6.9.1, ch. 6.9.2, ch. 6.13.2, ch. 13.1, ch. 15.5

[4] 3GPP TS 23.003, V6.8.0
3rd Generation Partnership Project;
Technical Specification Group Core Network and Terminals;
Numbering, addressing and identification
(Release 6) applicable chapters: ch. 6.1, ch. 6.2, ch. 6.3

[5] 3GPP TS 22.101, V6.11.0
3rd Generation Partnership Project;
Technical Specification Group Services and System Aspects;
Service principles
(Release 6) applicable chapters: ch. 7.4

[6] 3GPP TS 23.008, V6.8.0
3rd Generation Partnership Project;
Technical Specification Group Core Network and Terminals;
Organization of subscriber data
(Release 6) applicable chapters: ch. 2.2.3, ch. 5.1, ch. 5.2
There also exist other proprietary methods for detection of new terminals.

[7] 3GPP TS 29.061
3rd Generation Partnership Project;
Technical Specification Group Core Network and Terminals;
Interworking between the Public Land Mobile Network (PLMN) supporting packet based services and Packet Data Networks (PDN)

The invention claimed is:

1. A method for detecting devices with incorrect GPRS configuration including in a Gateway GPRS Support Node performing the steps:
receiving, from a Serving GPRS Support Node, a PDP context activation request comprising a default APN indicating an invalid APN was received by the Serving GPRS Support Node;
detecting the default APN;
based on the default APN received from the Serving GPRS Support Node, sending a device management request message to a Device Management System.

2. The method according to claim 1 wherein in the device management request message including at least one of an IMEISV, MSISDN or an IMSI parameter.

3. The method according to claim 2 wherein the device management request message is a Remote Authentication Dial In User Service, RADIUS, Accounting message.

4. The method according to claim 2 wherein the device management request message includes an Internet Protocol, IP, address of the device.

5. The method according to claim 1 including after the step of sending a device management request message, performing steps comprising:
receiving a device management response message;
sending a create PDP context response to the Serving GPRS Support Node.

6. A Gateway GPRS Support Node for detecting devices with incorrect GPRS configuration, said Gateway GPRS Support Node comprising:
a processor and
a memory having instructions accessible from said memory and processable by said processor to perform steps comprising:
receiving, from a Serving GPRS Support Node, a PDP context activation request comprising a default APN indicating an invalid APN was received by the Serving GPRS Support Node;
detecting the default APN:
based on the default APN received from the Serving GPRS Support Node, sending a device management request message to a Device Management System.

* * * * *